April 18, 1967   H. E. KALLMANN   3,315,237
FERRITE MEMORY CELLS AND MATRICES
Filed March 18, 1957                    2 Sheets-Sheet 1
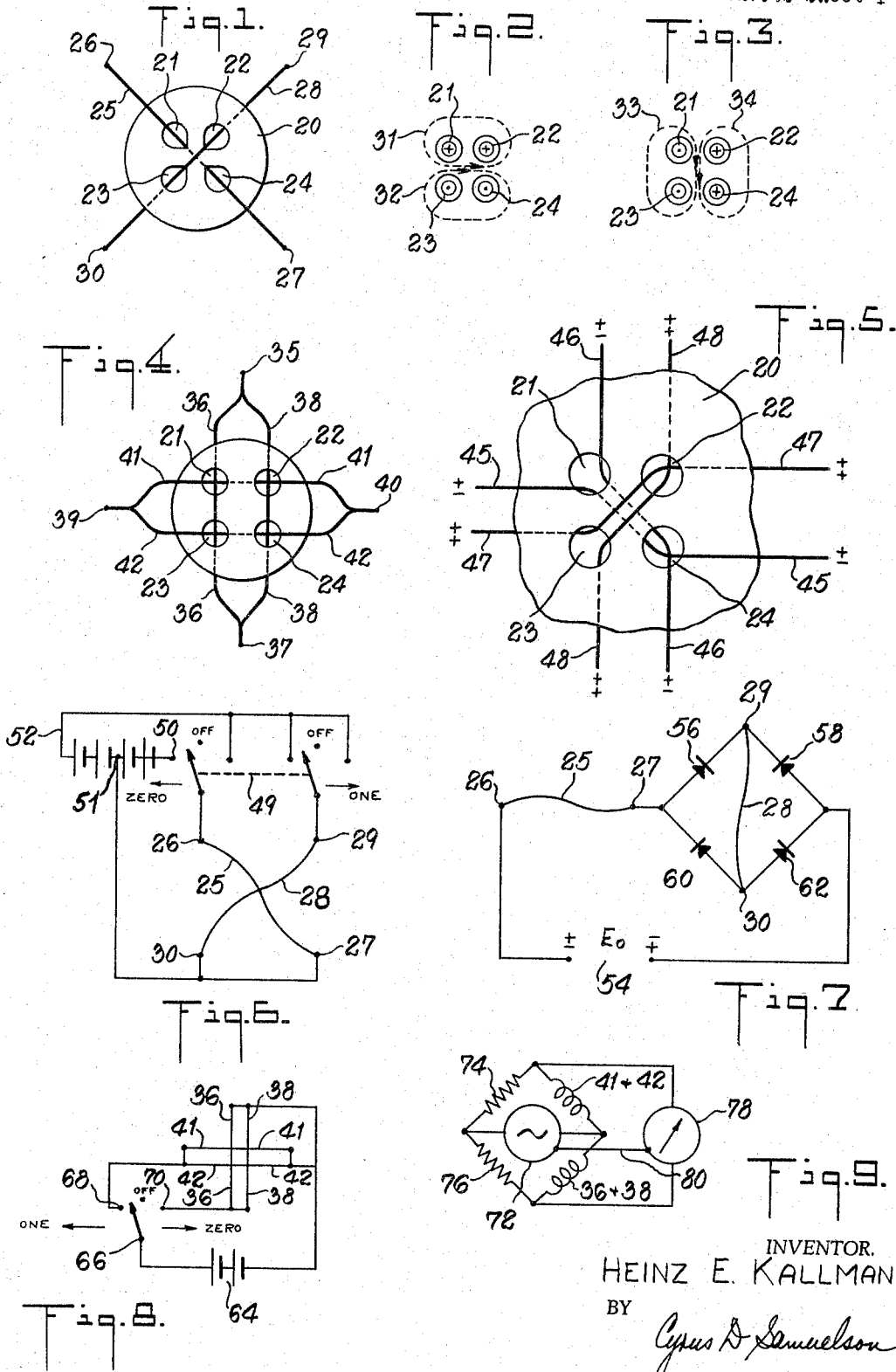
INVENTOR.
HEINZ E. KALLMANN
BY
Cyrus D. Samuelson
ATTORNEY

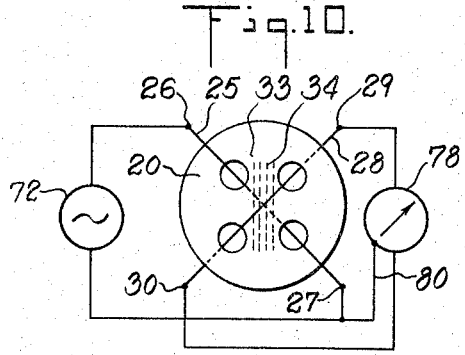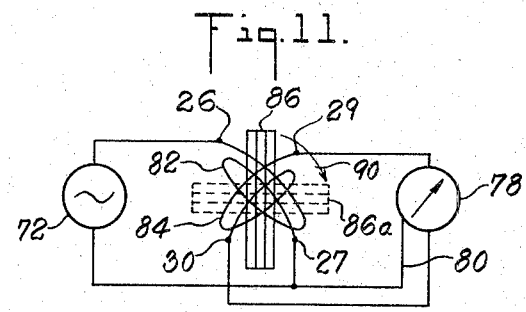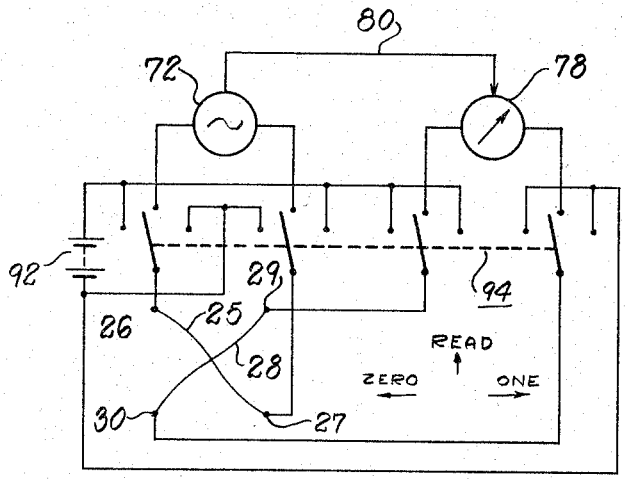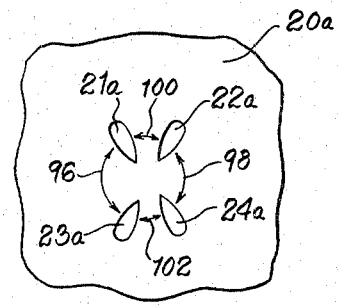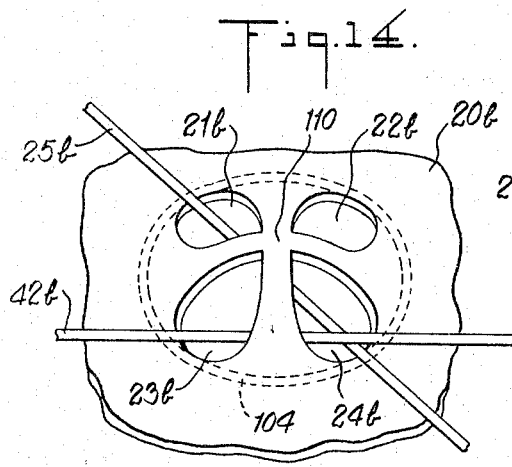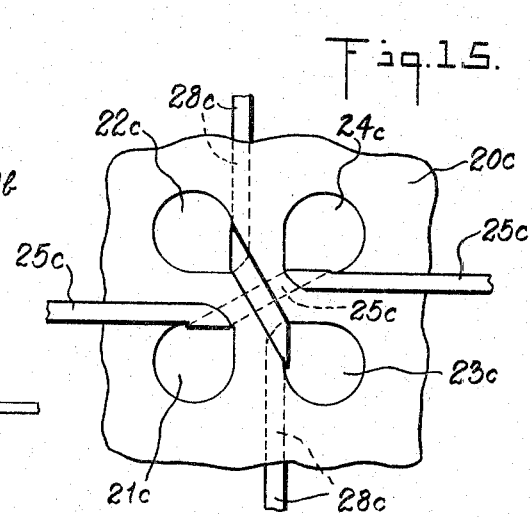
INVENTOR.
HEINZ E. KALLMANN
BY
ATTORNEY United States Patent Office 3,315,237
Patented Apr. 18, 1967

3,315,237
FERRITE MEMORY CELLS AND MATRICES
Heinz E. Kallmann, New York, N.Y., assignor to Gulton Industries, Inc., Metuchen, N.J., a corporation of New Jersey
Filed Mar. 18, 1957, Ser. No. 646,919
22 Claims. (Cl. 340—174)

My invention relates to ferrite static-memory cells and in particular to such cells which may be assembled in matrices for information storage.

At the present time, memory cells, which are used in information storage matrices, comprise ring-shaped bodies (toroids) formed of ferromagnetic alloys or ferrite ceramics having a substantially square B-H loop. One or more conductors are threaded through the central opening in the toroid. In operation, these cells are magnetized to a state of saturation by a current pulse of suitable value in one or more of the conductors. This current pulse is generally designated as the "writing" pulse. Depending upon the polarity of the writing pulse, the magnetization of the toroid is polarized in one or the other of two directions around the toroid, generally referred to as states ONE and ZERO. The magnetic fields of these two magnetized conditions are indistinguishable except for polarity. The determination of the polarity of the stored magnetic field is called "reading." In order to read the polarity of the magnetic field, it is necessary to pass a test or reading signal (a current pulse of known polarity) through the toroid and to observe whether the stored field changes in polarity. From this change, or lack of change, under the influence of a current pulse of known polarity, the polarity of the originally stored magnetic field is known and hence the polarity of the current that wrote it. Unfortunately, this method of reading destroys the stored information and it is necessary to restore the original magnetic field by rewriting after each reading. It can be seen that much can be saved if one uses a memory system which does not need to be rewritten after each reading.

Accordingly, it is a principal object of my invention to provide a ferrite memory storage cell which may be read any number of times without disturbing the stored information and without the need for rewriting after each reading.

It is a further object of my invention to provide such a cell in which the volume of the stored field is small so that the power required for the writing pulses is low.

It is a still further object of my invention to provide such a cell which is simple and may be produced economically.

It is a still further object of my invention to provide such cells which may be easily assembled in compact large-capacity memory matrices.

It is a still further object of my invention to provide a single ferrite sheet comprising a plurality of such memory cells.

Other objects and advantages of my invention will be apparent during the course of the following description.

In order to achieve these objects, I have invented a memory cell in which the stored states ONE and ZERO differ from each other in ways other than the polarity of one form of magnetic field. I accomplish this by providing two magnetic states such that the fields ONE and ZERO in at least a part of the magnetized material result in magnetic alignments which are distinguishably different. By "distinguishably different" I mean differences which may be detected without disturbing the stored field so that it does not have to be rewritten after each reading. So that the ONE and ZERO fields may be "distinguishably different" the change in angle of magnetic alignment must be preceptibly different from both 0° and 180° which latter is merely a change in polarity.

According to my invention, I provide a memory cell wherein the magnetic alignments for ONE and ZERO differ from each other in direction by substantially 90° within an area of the total magnetized region (test area). Since I have also found that the permeability of the magnetized material measured in the direction of the magnetic alignment differs from that measured at 90° to it, the direction of magnetization can easily be determined or read by comparing the inductance of two crossed coils surrounding the test area, or by comparing the coupling of a third coil to two such coils. I accomplish this in either case using test signals which are much too weak to disturb the existing stored magnetic state.

In the accompanying drawings, forming a part of this application, and in which like numerals are employed to designate like parts throughout the same:

FIGURE 1 is a plan view of a preferred embodiment of my invention illustrating a suitable configuration of the holes and conductors of a memory cell, FIGURE 2 is a diagrammatic view of the magnetic field stored after writing ZERO, FIGURE 3 is a diagrammatic view of the magnetic field stored after writing ONE, FIGURE 4 illustrates an alternative arrangement of the writing conductors, FIGURE 5 illustrates a conductor arrangement similar to that of FIGURE 1, modified for coincidence current in a cell matrix, FIGURE 6 is a schematic diagram of a writing circuit to be used in conjunction with the cell of FIGURE 1, FIGURE 7 is a schematic diagram of an alternative writing circuit to be used in conjunction with the cell of FIGURE 1, FIGURE 8 is a schematic diagram of a writing circuit to be used in conjunction with the cell of FIGURE 4, FIGURE 9 is a schematic diagram of a bridge circuit used for comparing self inductances, for reading the cell of FIGURE 4, FIGURE 10 is a schematic diagram of a circuit for reading the cell of FIGURE 1 by observing the coupling unbalance in the cell, FIGURE 11 illustrates the air-coil analog of FIGURE 10, FIGURE 12 is a schematic diagram of a combined writing and reading circuit for the cell of FIGURE 1.

FIGURE 13 is a plan view of an alternative embodiment of my invention wherein the arrangement of the holes is unbalanced and the ZERO output signal can be made zero, FIGURE 14 is a perspective view of an alternative embodiment of my invention wherein the ferrite plate is dimpled at the location of the memory cell whereby it is possible to use straight matrix conductors, and FIGURE 15 is a cell similar to that of FIGURE 1 wherein the conductors comprise wiring printed on the ferrite.

In the drawings, wherein, for the purpose of illustration, are shown preferred embodiments of my invention, the numeral 20 designates a circular disc or button of suitable ferrite ceramic material pierced by four substantially equal holes, 21, 22, 23 and 24 at the corners of a square in the center of the cell. Two conductors 25 and 28 are threaded through these holes; 25 connects terminal 26, threaded down through hole 21 and up through hole 24, to terminal 27, and 28 connects terminal 29, threaded up through hole 22 and down through hole 23, to terminal 30. To write in this cell, suitable current pulses are transmitted through both conductors simultaneously. These pulses are of substantially equal amplitude and start and top substantially simultaneously. One of the currents will be called the writing current; let us assume this to be that through conductor 25. In accordance with the practice in the art, the writing current polarity for ONE is opposite to that for ZERO. The other current, that through 28, will be called the bias current and its polarity is the same, regardless of whether a ONE or ZERO is to be written. The stored information then consists of the pattern of magnetization around the holes in 20 and this pattern depends upon the combined fields set up by the writing and bias current pulses.

FIGURE 2 illustrates the pattern of magnetization for a written ZERO, assuming that the bias current flows from terminal 29 to terminal 30, going up through hole 22 and down through hole 23 and that the writing current flows from terminal 27 to terminal 26, going down through hole 24 and up through hole 21. In both FIGURES 2 and 3, the circled dots indicate that the current is going down through the hole and the circled crosses indicate that the current is going up through the hole. The resulting magnetic pattern is then split into two closed paths shown as dotted loops 31 and 32 with the arrows pointing in the direction of magnetic north. 31 surrounds 21 and 22 wherein the currents flow up and 32 surrounds 23 and 24 wherein the currents flow down. While the direction of magnetic north is immaterial, it is to be noted that, for written ZERO, the direction of magnetization in the region surrounded by the four holes is left-right.

FIGURE 3 illustrates the corresponding pattern of magnetization for written ONE, with the bias current flowing as in FIGURE 2 and with the writing current flowing from 26 to 27, going down through 21 and up through 24. The new magnetic paths are now indicated by 33 and 34, 33 surrounding 21 and 23 where the currents flow down and 34 surrounding 22 and 24 where the currents flow up. It is to be noted that the magnetic field patterns of FIGURES 2 and 3 intersect at the center of 20 at an angle of 90° and that writing ZERO will automatically upset an existing ONE and vice versa. By shaping the holes so they are pointed toward the center, as shown in FIGURE 1, and thereby further confining the cross-over area, I have found that I am able to obtain further economy in both the writing and bias currents.

By using the conductor arrangement illustrated in FIGURE 4, it is possible to write with only one current pulse. One conductor from 39 to 40 is split into two parallel branches, the first, 41, going down through 21 and up through 22 and the second, 42, going down through 23 and up through 24. A current pulse through these conductors will set up the magnetic fields of FIGURE 3 and write ONE. Another pair of parallel branches 36 and 38 connects terminals 35 and 37, 36 going up through 21 and down through 23 and 38 going up through 22 and down through 24. A current through these conductors will set up the magnetic field pattern of FIGURE 2 and write ZERO. The corresponding writing circuits then would not provide a current pulse whose polarity is changed from ONE to ZERO but instead a pulse of arbitrary polarity, flowing through two alternative paths, from 39 to 40 to write ONE and from 35 to 37 to write ZERO. The same effect can be achieved by connecting the two branches from 39 to 40 in series (not shown), the conductor going down through 21, up through 22, then down through 23 and up through 24 to 40. Similarly, the conductor from 35 goes up through 21, down through 23, then up through 22 and down through 24 to 37.

It is desirable to be able to combine a group of these memory cells into a matrix. This can be done by using separate discs such as have been described and connecting them, as toroids are connected up to now, by threading the conductors through the individual cells. But, this method is uneconomical, and I have found that I can improve upon it by producing a matrix from a single large ferrite plate with spaced groups of four holes, each group forming a single cell. It may appear, at first, that the magnetic fields from one cell would interfere with the magnetic fields of the adjacent cells; but, because the flux density falls off rapidly with distance this effect is negligible if cells are spaced two or three pattern diagonals apart. Consequently, using cells of my invention, I have been able to form memory matrices on a single sheet of ferrite ceramic. Using the conventional techniques of coincident current writing, each cell is threaded with an $x$ and $y$ conductor, each of these being fed with half the required writing current. These $x$ and $y$ currents will suffice for writing only where they intersect, that is, at the desired cell.

FIGURE 5 illustrates a region 20 of a ferrite memory matrix plate with four holes similar to those of FIGURE 1 and bearing the same numbers. Original writing conductor 25 is replaced by $x$ writing conductor 45 and $y$ writing conductor 46 both marked $\mp$ to indicate changeable polarity and original bias conductor 28 is replaced by $x$ bias conductor 47 and $y$ bias conductor 48 both marked $\ddagger$ to indicate unchanging polarity.

FIGURE 6 is a schematic diagram of a circuit for writing in the cell of FIGURE 1. Terminals 27 and 30 are connected to the center tap 51 of a current source with negative terminal 50 and positive terminal 52. Double pole switch 49 connects terminal 29 to 52 in both the ONE and ZERO positions and connects 26 to 50 when writing ZERO and 26 to 52 when writing ONE.

If writing must be accomplished by using a single source of current pulses of either polarity, the circuit of FIGURE 7 may be used. Writing conductor 25 between terminals 26 and 27 and bias conductor 28 between terminals 29 and 30 are numbered and threaded as in FIGURE 1. A current pulse of the correct polarity for either ONE or ZERO is fed from current source 54. Both 25 and 28 carry coincident, equal pulses because they are in series. When the polarity of 54 is reversed, the current in 25 (writing current) is reversed but due to the circuit relationship of rectifiers 56, 58, 60 and 62 with 28, the current in 28 (bias current) is not reversed. It is obvious that, in a memory matrix, a plurality of writing conductors may be connected between terminals 26 and 27 of FIGURE 7 and a plurality of bias conductors may be connected between terminals 29 and 30 of FIGURE 7 so that one rectifier bridge can be made to serve a large number of cells.

FIGURE 8 illustrates a basic writing circuit for the conductor arrangement of FIGURE 4. Current source 64 is connected by switch 66 to the pairs of writing conductors 36–38 or 41–42. When switch 66 is connected to terminal 68 and thence to conductors 41 and 42, the system writes ONE and when 66 is connected to 70 and thence to 36 and 38, the system writes ZERO.

In order to read the information stored in the cell, it is necessary to determine whether the pattern of magnetization is that of FIGURE 2 or of FIGURE 3. I have found that the permeability of the magnetized ferrite when measured parallel to the direction of magnetization is substantially different from that when measured perpendicular to the direction of magnetization. A preferred method is to surround the cell's central region with two equal, mutually perpendicular windings, one parallel to the direction of ZERO magnetization and the other parallel to the direction of ONE magnetization and to compare their self-inductance. The conductor arrangement of FIGURE 4 lends itself to this method of reading as shown in FIGURE 9. A weak source 72 of alternating current of any convenient frequency, for example, 10 kc. is connected across two opposite terminals of a bridge which is composed of equal impedances 74 and 76 in two of the arms, a third arm comprising the inductance of 36 and 38 and a fourth arm comprising the inductance of 41 and 42. The bridge is balanced when no information is stored in the cell. Depending on whether a ONE or ZERO is written, the inductance of one of the inductive arms will be greater than that of the other and the bridge will become unbalanced. The unbalance is displayed on indicator 78. Since the writing currents for ONE and ZERO are substantially equal, the resulting differences in inductance will be substantially equal, so that the absolute indications on 78 to read ONE or ZERO will be substantially equal. In order to determine whether ONE or ZERO has been written, it is necessary to make indicator 78 phase sensitive. A phase reference signal is fed from 72 to 78 by connection 80 and 78 is deflected in one direction when ONE is written and in the other direction when ZERO is written. Phase detectors of moderate sensitivity may safely be used even when the output of 72 is very weak. In fact, I have obtained excellent results with test signals from 72 far weaker than could be applied continuously without disturbing the written state magnetic fields.

An alternative method for reading the written state of a cell is shown in FIGURE 10. This figure illustrates a circuit for reading the state of the cell of FIGURE 1. Alternating current source 72, of any convenient frequency and so weak that its presence does not disturb the written states, is connected across terminals 26 and 27 of conductor 25. Phase sensitive indicator 78 is connected across terminals 29 and 30 of conductor 28 and connection 80 supplies a phase reference signal from 72 to 78. When no written state is present in 20, there is no coupling between 25 and 28 because they cross at right angles and the associated magnetic fields in the ferrite cross at right angles. If, however, a ONE or ZERO is written in 20, the resulting magnetic alignment in the central region surrounded by the holes will be either as shown by the dotted lines 33 and 34 of FIGURE 10 (carried from FIGURE 3) or perpendicular to the dotted lines of FIGURE 10 (that is, as in FIGURE 2). In either case, the resulting written magnetic field makes an angle of 45° with each of the crossed magnetic fields associated with 25 and 28.

FIGURE 11 serves to explain the principles underlying this method of reading. Assume that 25 has been replaced by wide, flat air coil 82 and 28 has been replaced by a similar coil 84, perpendicular to 82, the combination being connected to 72 and 78 as heretofore. Ferromagnetic bar 86 is positioned at an angle of 45° to the magnetic axes of 82 and 84 just as 33 and 34 make an angle of 45° to 25 and 28. 86 provides magnetic coupling between 82 and 84 since it is a core common to both. If 86 is now rotated along arrow 90 to dotted position 86a, it again provides magnetic coupling between 82 and 84. However, it is to be noted that while 82 surrounds 86a with the same winding sense as it does 86, the winding sense of 84 is reversed from 86 to 86a. Therefore, it follows that the output amplitude will be the same for 86 and 86a but the output phase will be reversed. 78 will detect this phase with the aid of phase reference connection 80. Thus, it can be seen that the magnetic alignments 33 and 34 of FIGURE 10 will provide a coupling between 25 and 28 and that the coupling will be of opposite phase if the alignments are perpendicular to 33 and 34. 78 will indicate whether ONE or ZERO has been written in 20 depending upon the phase of the signal in 78. Here again, I have found that a phase detector of moderate sensitivity will yield safe readings when used in conjunction with an A.-C. source 72 which is far too weak to disturb the stored information.

FIGURE 12 illustrates a circuit which combines the writing circuit of FIGURE 6 and the reading circuit of FIGURE 10. In its center position four-pole, three position switch 94 connects 25 and 28 to 72 and 78 for reading. 94 writes ZERO when moved to the left and writes ONE when moved to the right since the current from source 92 through 25 is reversed while the current in 28 is not.

FIGURE 13 illustrates a ferrite cell 20a similar to 20 of FIGURE 1 except that the four spacings between holes 21a, 22a, 23a and 24a are not uniform. Equal distances 100, between 21a and 22a, and 102, between 23a and 24a, are less than equal distances 96, between 21a and 23a, and 98, between 22a and 24a. Thus 21a, 22a, 23a and 24a are located at the corners of a rectangle instead of at the corners of a square. When such a configuration is used in conjunction with the reading circuit of FIGURE 10, magnetic coupling exists between 25 and 28 because the conductors are no longer perpendicular even without an unbalance due to the alignment of the ferrite. The direction and degree of this geometric unbalance may be so chosen that the magnetic coupling resulting from it and that from a written ZERO just cancel. The indicator, which need not be phase sensitive, will display no output when ZERO is written and approximately twice the original output when ONE is written.

Another reading arrangement, which dispenses with the need for a phase sensitive indicator, utilizes weak, brief current pulses in lieu of a continuous alternating current. Since the phases of all harmonics constituting the reading pulse are reversed for ONE and ZERO, it follows that, with the same input pulse, a positive output pulse for written ONE will become a negative output pulse for written ZERO. If, in addition, geometric unbalance as illustrated in FIGURE 13 is provided, then the weak, positive reading pulses will produce positive output pulses for written ONE and no output pulses for written ZERO.

In order to simplify the assembly of ferrite memory cells in matrices, it is desirable to design matrix plates suitable for use of straight conductors. I accomplish this in the manner illustrated in FIGURE 14. Ferrite plate 20b is deformed before firing so that dimple 110, with substantially circular form at its base 104, is formed at the locations selected for the cells. After holes 21b, 22b, 23b and 24b are pierced in 110 and the sheet is fired, each cell appears as a raised cross. Wires may be threaded through opposite holes such as 25b through 21b and 24b or through adjacent holes such as 42b through 23b and 24b. Obviously, any wiring combination for writing or reading such as have been described may be used in conjunction with cells or matrices of cells such as have been illustrated in FIGURE 14.

I have also found that I can form two matrices on a single sheet by using the dimple form illustrated in FIGURE 14 wherein there are dimples on both sides of the ferrite sheet. The necessary cell spacing, as described above, must be maintained so that there is no interaction between any of the cells of the matrices.

A still further embodiment utilizes printed or etched wiring on a flat pierced ferrite plate. The hole configuration of FIGURE 1 is shown in FIGURE 15 with printed conductors 25c and 28c shown in solid lines where they are above the plate and in dotted lines where they are behind the plate. The conductors pass through the holes at the points at which the change from solid lines to dotted lines occur. Any of the previously illustrated and described conductor configurations may be used in conjunction with the printed or etched wiring technique described in connection with FIGURE 15, so long as the conductors do not cross on the same side, or the necessary insulation is provided between such crossing conductors.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described my invention, I claim:

1. A cell for a magnetic memory matrix comprising: a body of saturable magnetic material having a first and second pair of contiguous holes located along respective lines which intersect at a point located within the space bounded by said pairs of holes, writing means for selectively providing two different magnetic flux path configurations in said body of magnetic material to provide a non-varying or constant magnetic flux therein in either of two transverse directions, one of said flux path configurations comprising a first pair of closed magnetic flux paths having a common reinforcing path portion extending between said pairs of holes in a first direction at an angle of 45° to said lines and the other of which comprises a second pair of closed magnetic flux paths having a common reinforcing path portion extending between said pairs of holes in a direction at right angles to said first direction, said writing means including a first conductor threading through said first pair of holes, a second conductor threading through said second pair of holes, energizing current means for simultaneously feeding current through both of said conductors and including means for selectivity reversing the direction of flow of current through one of said conductors without disturbing the direction of flow in the other conductor, and reading means selectively responsive to said two magnetic flux path configurations, said reading means including a source of pulsating current to be connected to one of said conductors which current is of insufficient magnitude to disturb the magnetic flux path configuration in said body of magnetic material, and voltage responsive means to be connected to the other conductor, and means for selectively simultaneously switching said conductors between said energizing current means on the one hand and said source of pulsating current and voltage responsive means on the other hand.

2. A cell for a memory matrix as described in claim 1 wherein said body of magnetic material is in sheet form, the portion of said sheet material including said two pairs of holes protruding outwardly from the general plane of the sheet, and said conductors passing through said holes in a plane substantially parallel to the plane of the sheet.

3. A cell for a memory matrix as described in claim 1 wherein said energizing current means comprises a rectifier bridge circuit which maintains a given relative polarity between opposite corners of the bridge independently of the polarity of the voltage fed to the other opposite corners of the bridge, a series circuit connected between the latter opposite corners of the bridge comprising one of said conductors and a reversible source of direct current voltage, and the other of said conductors connected between said first-mentioned corners of the bridge.

4. A cell for a magnetic memory matrix comprising: a body of saturable magnetic material having a first and second pair of contiguous holes located along respective lines which intersect at a point located within the space bounded by said pairs of holes, writing means for selectively providing two different magnetic flux path configurations in said body of magnetic material to provide a non-varying or constant magnetic flux therein in either of two transverse directions, one of said flux path configurations comprising a first pair of closed magnetic flux paths having a common reinforcing path portion extending between said pairs of holes in a first direction at an angle of 45° to said lines and the other of which comprises a second pair of closed magnetic flux paths having a common reinforcing path portion extending between said pairs of holes in a direction at right angles to said first direction, said writing means including a first conductor threading through said first pair of holes, a second conductor threading through said second pair of holes, energizing current means for simultantously feeding current through both of said conductors and including means for selectively reversing the direction of flow of current through one of said conductors without disturbing the direction of flow in the other conductor, and reading means selectively responsive to said two magnetic flux path configurations, said reading means including a source of pulsating current to be connected to one of said conductors which current is of insufficient magnitude to disturb the magnetic flux path configuration in said body of magnetic material, and phase sensitive voltage responsive means to be connected to the other conductor in which a voltage of one phase or another is induced depending upon the flux path configuration, and means for selectively simultaneously switching said conductors between said energizing current means on the one hand and said source of pulsating current and voltage responsive means on the other hand.

5. A cell for a magnetic memory matrix comprising: a body of saturable magnetic material having a first and second pair of contiguous holes located along respective lines which intersect at a point located within the space bounded by said pairs of holes, writing means for selectively providing two different magnetic flux path configurations, in said body of magnetic material to provide a non-varying or constant magnetic flux therein in either of two transverse directions, one of said flux path configurations comprising a first pair of closed magnetic flux paths having a common reinforcing path portion extending between said pairs of holes in a first direction at an angle of 45° to said lines and the other of which comprises a second pair of closed magnetic flux paths having a common reinforcing path portion extending between said pair of holes in a direction at right angles to said first direction, said writing means including a first pair of conductors threading through different adjacent pairs of said holes and a second pair of conductors threading through different adjacent pairs of said holes, each of the latter pairs comprising one hole from each of said former pairs of holes.

6. A cell for a magnetic memory matrix comprising: a body of saturable magnetic material having a first and second pair of contiguous holes located along respective lines which intersect at a point located within the space bounded by said pairs of holes, writing means for selectively providing two different magnetic flux path configurations, in said body of magnetic material to provide a non-varying or constant magnetic flux therein in either of two transverse directions, one of said flux path configurations comprising a first pair of closed magnetic flux paths having a common reinforcing path portion extending between said pairs of holes in a first direction at an angle of 45° to said lines and the other of which comprises a second pair of closed magnetic flux paths having a common reinforcing path portion extending between said pair of holes in a direction at right angles to said first direction, said writing means including a pair of "X" axis writing conductors and a pair of "Y" axis writing conductors, one each of said "X" axis writing conductors and said "Y" axis writing conductors threading through said first pair of holes and the other of said conductors threading through said second pair of holes.

7. A cell for a magnetic memory matrix comprising: a body of saturable magnetic material having a first and second pair of contiguous holes located along respective lines which intersect at a point located within the central portion of an area bounded by said pairs of holes, writing means for selectively providing two different magnetic flux path configurations in said body of magnetic material to provide a non-varying or constant magnetic flux therein in either of two transverse directions, one of said flux path configurations comprising a first pair of closed magnetic flux paths having a common reinforcing path portion extending between said pairs of holes in a first direction at an angle to said lines and the other of which comprises a second pair of closed magnetic flux paths having a common reinforcing path portion extending between said pairs of holes in a direction transversely of said first direction, and reading means selectively responsive to said two magnetic flux path configurations, said writing means includes a first conductor threading through a pair of said holes and a second conductor threading through a pair of said holes at least one of which is not one of the first mentioned pair of holes.

8. A cell for a magnetic memory matrix comprising: a body of saturable magnetic material having a first and second pair of contiguous holes located along respective lines which intersect at a point located within the central portion of an area bounded by said pairs of holes, writing means for selectively providing two different magnetic flux path configurations in said body of magnetic material to provide a non-varying or constant magnetic flux therein in either of two transverse directions, one of said flux path configurations comprising a first pair of closed magnetic flux paths having a common reinforcing path portion extending between said pairs of holes in a first direction at an angle to said lines and the other of which comprises a second pair of closed magnetic flux paths having a common reinforcing path portion extending between said pairs of holes in a direction transversely of said first direction, said writing means including a first conductor threading through a pair of said holes, a second conductor threading through a pair of said holes at least one of which is not one of the first mentioned pair of holes and means for selectively providing a selection of current flow patterns in said conductors, and reading means selectively responsive to said two magnetic flux path configurations without disturbing the set flux path configuration.

9. A cell for a memory matrix as described in claim 8 wherein said holes are pointed toward the center portion of the area bounded thereby.

10. A cell for a memory matrix as described in claim 8 wherein the corresponding holes of said two pairs of holes are spaced from one another a distance substantially different from the spacings between the non-corresponding holes of said pairs of holes.

11. A cell for a memory matrix as described in claim 8 wherein said body of saturable magnetic material is a ferrite ceramic material in sheet form, and said conductors being printed on said ferrite sheet material.

12. A cell for a magnetic memory matrix comprising: a body of saturable magnetic material having a first and second pair of contiguous holes located along respective lines which intersect at a point located within the space bounded by said pairs of holes, writing means for selectively providing two different magnetic flux path configurations in said body of magnetic material to provide a non-varying or constant magnetic flux therein in either of two transverse directions, one of said flux path configuration comprising a first pair of closed magnetic flux paths having a common reinforcing path portion extending between said pairs of holes in a first direction at an angle to said lines and the other of which comprises a second pair of closed magnetic flux paths having a common reinforcing path portion extending between said pair of holes in a direction transversely of said first direction, said writing means including a first pair of conductors threading through different adjacent pairs of said holes and a second pair of conductors threading through different adjacent pairs of said holes, each of the latter pairs of holes comprising only one hole from each of said former pairs of holes and energizing current means for providing a selection of current flow patterns in said conductors to provide both of said flux path configurations, and reading means selectively responsive to said two magnetic flux path configurations without disturbing the set flux path configuration.

13. A cell for a memory matrix as described in claim 12 wherein said reading means includes a bridge circuit in which said first and second pair of parallel conductors are respectively located in separate arms of the bridge circuit, a source of pulsating current connected across one of the opposite corners of the bridge circuit, and a phase sensitive voltage responsive means connected across the other opposite corners of the bridge circuit.

14. A cell for a magnetic memory matrix comprising: a body of saturable magnetic material having a first and second pair of contiguous holes located along respective lines which intersect at a point located within the central portion of an area bounded by said pairs of holes, writing means for selectively providing two different magnetic flux path configurations in said body of magnetic material to provide a non-varying or constant magnetic flux therein on either of two transverse directions, one of said flux path configurations comprising a first pair of closed magnetic flux paths having a common reinforcing path portion extending between said pairs of holes in a first direction at an angle to said lines and the other of which comprises a second pair of closed magnetic flux paths having a common reinforcing path portion extending between said pairs of holes in a direction transversely of said first direction, said writing means comprising a pair of "X" axis writing conductors and a pair of "Y" axis writing conductors, one each of said "X" axis writing conductors and said "Y" axis writing conductors threading through said first pair of holes and the other of said conductors threading through said second pair of holes and means for selectively feeding energizing current through either said "X" or "Y" axis conductors, and reading means selectively responsive to said two magnetic flux path configurations without disturbing the set flux path configuration.

15. A magnetic device comprising a plate of substantially rectangular hysteresis loop material having a plurality of clusters of apertures in said material, the apertures of any one cluster having a relatively small center-to-center spacing to provide a single magnetic element defined by the material about that one cluster, said element having two remanent states, and a plurality of sets of selecting windings, each set of said selecting windings being linked in combinatorial fashion through the separate apertures of a different group of said clusters, any one of said clusters being common to at least two of said sets of selecting windings.

16. The magnetic device of claim 15 wherein each of said clusters of apertures are positioned around a given area of a region of the plate, and means providing a first current pattern in each set of windings for driving the associated region to one of said remanent states, and for providing another current pattern in each set of windings for driving the associated region to the other remanent state.

17. The magnetic device of claim 15 wherein each of said clusters of apertures include a first and second pair of contiguous holes located along respective lines which intersect at a point located within the central portion of an area bounded by said pairs of holes and there is provided current feeding means coupled to said sets of windings for selectively providing two different magnetic flux path configurations in said body of magnetic material to provide non-varying or constant magnetic flux therein in either of two transverse directions, one of said flux path configurations comprising a first pair of closed magnetic flux paths having a common reinforcing path portion extending between said pairs of holes in a first direction at an angle to said lines and the other of which comprises a second pair of closed magnetic flux paths having a common reinforcing path portion extending between said pairs of holes in a direction transversely of said first direction, and reading means selectively responsive to said two magnetic flux path configurations without disturbing the set flux path configuration.

18. The magnetic device of claim 17 wherein each of said sets of windings comprises at least two conductors threading through each cluster of holes, and said current feeding means simultaneously feeding current through said conductors and providing a selection of current flow patterns in said conductors to provide either one of said flux path configurations.

19. Memory apparatus comprising a plate of magnetic material having at least two states of magnetic remanence, said plate comprising a plurality of memory elements each including a plurality of spaced apertures around a given area of a separate reginon of the material of said plate, first and second winding means inductively coupled to each of said regions of material, each first winding means passing through at least one of the apertures around the associated area for selectively driving said region to either one of two states or magnetic remanence, each second winding means passing through at least one of the other apertures around the associated area for selectively driving said region to the other state of magnetic remanence, and means for sensing the state of magnetic remanence of each of said regions of material.

20. Memory apparatus comprising a plate of magnetic material having at least two states of magnetic remanence, said plate comprising a plurality of memory elements each including a plurality of spaced apertures around a given area of a separate region of the material of said plate, a set of windings inductively coupled to each of said regions of said material by passing through apertures thereat, and means for providing a first current pattern in the windings at each selected region of the material for selectively driving the region to either one of said two states of magnetic remanence and for providing a different current pattern in the winding means at each selected region of the material for selectively driving the region of material to the other state of magnetic remanence.

21. A cell for a memory matrix as described in claim 20 wherein the plurality of spaced apertures of each memory element comprises four holes arranged at the corners of a square.

22. A cell for a magnetic memory matrix comprising: a body of saturable magnetic material having a first and second pair of contiguous holes located along respective lines which intersect at a point located within the space bounded by said pairs of holes; writing means for selectively providing two different magnetic flux path configurations in said body of magnetic material to provide a non-varying or constant magnetic flux therein in either of two transverse directions, one of said flux path configurations comprising a first pair of closed magnetic flux paths having a common reinforcing path portion extending between said pairs of holes in a first direction at an angle to said lines and the other of which comprises a second pair of closed magnetic flux paths having a common reinforcing path portion extending between said pairs of holes in a direction transversely of said first direction, said writing means including at least two conductors threading through said holes and energizing current means for simultaneously feeding current through said conductors and providing a selection of current flow patterns in said conductors to provide either one of said flux path configurations; and reading means selectively responsive to said two magnetic flux path configurations without disturbing the set flux path configuration, said reading means including a source of pulsating current connected to one of said conductors and a voltage responsive means connected to the other conductor, and means for selectively simultanously switching said conductors between said energizing current means, on the one hand, and said source of pulsating current and said voltage responsive means, on the other hand.

References Cited by the Examiner

UNITED STATES PATENTS

| 2,461,992 | 2/1949 | McCreary | 340—174 |
| 2,567,116 | 9/1951 | McCreary | 340—174 |
| 2,602,153 | 1/1952 | McCreary | 340—174 |
| 2,724,103 | 11/1955 | Ashenhurst | 340—174 |
| 2,814,794 | 11/1957 | Bauer | 340—174 |
| 2,818,555 | 12/1957 | Lo | 340—174 |
| 2,825,046 | 2/1958 | Herbert et al. | 340—174 |
| 2,845,611 | 7/1958 | Williams | 340—174 |
| 2,870,433 | 1/1959 | Simpson | 340—174 |
| 2,919,430 | 12/1959 | Rajchman | 340—174 |

BERNARD KONICK, *Primary Examiner.*

EVERETT R. REYNOLDS, IRVING L. SRAGOW, STEPHEN W. CAPELLI, *Examiners.*

M. A. MORRISON, J. W. MOFFITT, R. T. SADLER, J. J. POSTA, L. M. DALGARN, R. R. HUBBARD,
*Assistant Examiners.*